Jan. 31, 1928.
H. F. KOEPF
1,657,538
LAWN SPRINKLER
Filed Jan. 10, 1927
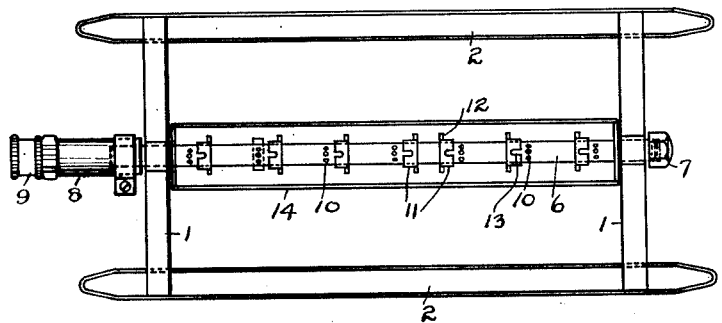
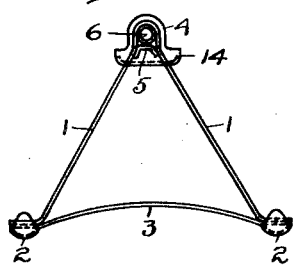
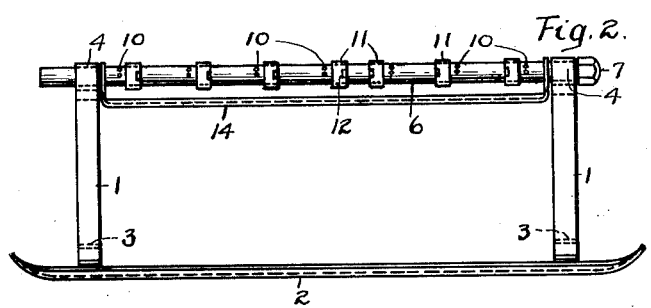
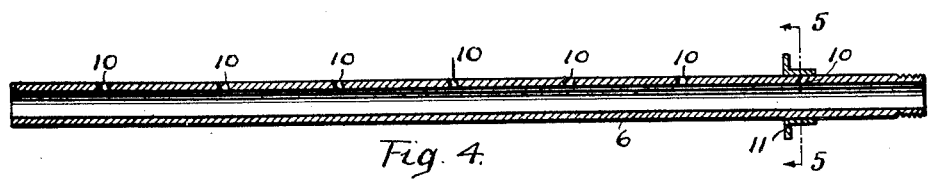
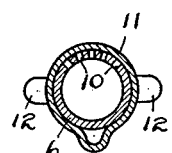
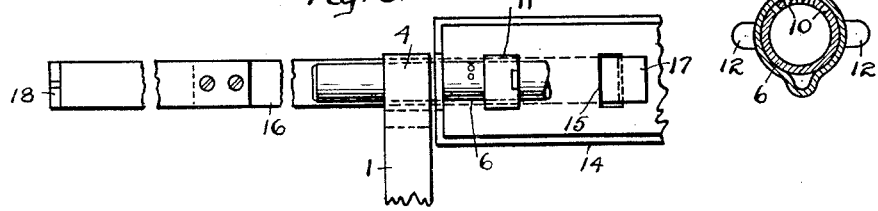
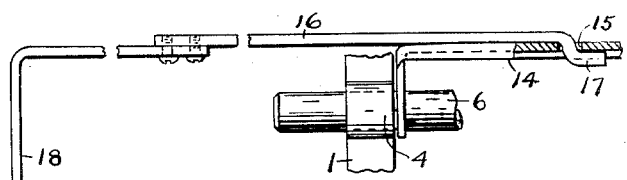
INVENTOR.
H. F. Koepf
BY Elwin M. Huby
ATTORNEY Patented Jan. 31, 1928.

1,657,538

UNITED STATES PATENT OFFICE.

HENRY F. KOEPF, OF FORT WAYNE, INDIANA.

LAWN SPRINKLER.

Application filed January 10, 1927. Serial No. 160,171.

The invention relates to sprinkling devices.

The object of the invention is to provide a compact and durable device that is portable while in operation and in which the liquid is discharged in jets in a multitude of directions.

Another object is to provide controlling means at the several jets by which selected jets may be closed and another object is to provide means whereby the spray may be diverted in any direction.

The invention is illustrated in the accompanying drawings, in which

Figure 1 is a plan view of a sprinkler embodying the invention; Fig. 2 a side elevational view of the same; Fig. 3 an end elevational view of the same; Fig. 4 an enlarged longitudinal cross-section of the spray tube; Fig. 5 a cross-section of line 5—5 of Fig. 4; Fig. 6 a fractional side view of the device illustrating the application of the spray interceptor or deflector and operating handle, and Fig. 7 is a plan view of the same.

In the illustrative embodiment of the invention the frame of the device comprises the preferably V-shaped standards 1 secured at the lower end of each leg to the skids 2. Cross braces 3 are also secured to the skids. Each skid is somewhat rounded transversely and its opposite ends are turned upwardly so that the skids will readily slide over the ground when pulled by the handle 16 hereafter described.

The upper end of each standard is bent to form a bearing 4, a bridge 5 being secured to the legs of the standard to form the bottom of the bearing. A tube 6 is supported in the bearings 4, one end of the tube being closed by the cap 7 and a section of hose 8 is secured to the opposite end of the tube. A hose coupling 9 is carried by the section 8. The coupling could be secured to the tube and thereby omit the section of hose.

Transverse rows of apertures 10 are formed in the upper side of the tube 6 at intervals between the two bearings 4. The apertures in a transverse row are preferably alike in direction; but as shown in Fig. 4 the central apertures 10 are at right angles to the longitudinal axis of the tube and the apertures in each row between the central row and the opposite ends of the tube are inclined toward said ends respectively, the inclination progressively increasing from the central row to the last row on each side of said central row, so that the apertures in the outermost rows direct their jets considerably beyond the ends of the tube, the central apertures direct their jets at right angles to the tube and the intermediate apertures direct their jets at right angles between those of the outermost and central apertures. A wide spread of the spray is, therefore, attained and a large area of ground is reached by the spray.

Ferrules 11 are slidably and rotatably mounted on the tube adjacent to each transverse row of apertures. Each ferrule has the finger grips 12 formed thereon by which to manipulate it in sliding the ferrule over the adjacent row of apertures for closing the same. An opening or notch 13 is formed in each ferrule on the side thereof that faces the adjacent row of apertures. This notch is of such width as to expose any selected aperture of the row when the ferrule is moved over said row. The notch may be formed so as to expose any selected number of apertures in a row. By adjusting the ferrules any of the rows of apertures may be closed entirely or selected apertures in any row may be closed so that the spray will be directed in the desired direction.

A guard or diverting member 14 is pivoted at its opposite ends on the tube 6 adjacent to the bearings, the engagement of the member on the pipe being such that the friction between the contacting parts will tend to cause the member to remain in any position to which it may be swung. To assure that the member retains its adjusted position and to adjust it at a distance, I form an opening 15 in the member in which the offset end 17 of a bar or handle 16 is adapted to be extended and engaged against the inner face of the member, the remainder of the bar resting on the outer face of the member 14 and extending beyond the device a selected distance. The outer end of the bar may be bent at an angle to the axis of the bar and tapered so that the foot 18, thus formed, may be engaged in the ground to hold the member in its adjusted position. In Fig. 5 the member 14 is shown in an extreme position for clearness. In practice, the member will be swung on the tube to intercept and divert the jets delivered by the apertures that are so disposed as to direct their jets to an undesirable side of the device. In such position of the member 14 the foot 18 may be engaged in the ground. This feature is valuable when, for example, the device is placed adjacent to a building, sidewalk or a plat of ground upon which it is desired to deliver no liquid.

The handle 16 is of such length that the operator may use it to move the device to new positions and he may use it to adjust the member 14 without turning off the water. The handle may be formed in sections which may be clamped together as shown in Figs. 6 and 7.

The device is readily manipulated and generates a most effective spray that is delivered over a large area when the device is entirely open, but which may be regulated to deliver a variety of sprays in a variety of directions.

What I claim is:

1. A lawn sprinkler consisting of a frame, a tube horizontally mounted on the frame and having a plurality of transverse rows of apertures formed therein, the apertures in the row at the middle point of the tube being substantially at right angles to the longitudinal axis of the tube and the apertures in the remaining rows being inclined outwardly, the inclination thereof progressively increasing toward the ends of the tube, members revolubly and slidably mounted on the tube adjacent to said rows of apertures respectively, each member being shaped to close all or a selected number of apertures in the respective transverse row on suitable movement of said member.

2. A lawn sprinkler consisting of a frame, a tube horizontally mounted on the frame, and having a plurality of transverse rows of apertures formed therein, members revolubly and slidably mounted on the tube, each member being shaped to close all or a selected number of apertures in one of the transverse rows on suitable movement thereof and a guard revolubly mounted on the tube and adapted to divert the fluid discharging from said transverse rows of apertures at any side of the tube.

3. A lawn sprinkler consisting of a frame, a tube horizontally mounted on the frame and having a plurality of transverse rows of apertures formed therein, members revolubly and slidably mounted on the tube adjacent to the said rows of apertures respectively to control said apertures and a revolubly mounted guard to divert the fluid discharging from said rows of apertures at any side of the tube.

In witness whereof I have hereunto signed my name this 30th day of December, 1926.

HENRY F. KOEPF.